(12) United States Patent
Kim (10) Patent No.: US 12,522,187 B2
(45) Date of Patent: Jan. 13, 2026

(54) ELECTRO-MECHANICAL BRAKE DEVICE AND METHOD OF CONTROLLING THE SAME

(71) Applicant: HYUNDAI MOBIS Co., Ltd., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 542 days.

(21) Appl. No.: 17/493,341

(22) Filed: Oct. 4, 2021

(65) Prior Publication Data

US 2022/0111824 A1    Apr. 14, 2022

(30) Foreign Application Priority Data

Oct. 13, 2020  (KR) .................. 10-2020-0132249

(51) Int. Cl.
*B60T 8/17*      (2006.01)
*B60T 13/74*     (2006.01)
*F16D 65/38*     (2006.01)

(52) U.S. Cl.
CPC .............. *B60T 8/17* (2013.01); *B60T 13/741* (2013.01); *B60T 2220/04* (2013.01); *F16D 2065/386* (2013.01)

(58) Field of Classification Search
CPC ........... B60T 8/17; B60T 13/74; B60T 13/741
(Continued)

(56) References Cited

U.S. PATENT DOCUMENTS 6,144,312 A * 11/2000 Will .......................... G06F 1/32
                                                    307/10.6
6,179,390 B1 * 1/2001 Guzorek ............... B60T 17/221
                                                    188/3 R
(Continued)

FOREIGN PATENT DOCUMENTS

| CN | 102463973 A |   | 5/2012 |
|----|-------------|---|--------|
| KR | 20110060260 A | * | 6/2011 |
| KR | 10-1610154 B1 |   | 4/2016 |

OTHER PUBLICATIONS

Chinese Office Action dated Jun. 10, 2023, issued in corresponding Chinese Patent Application No. 202111194514.1.
(Continued)

*Primary Examiner* — Logan M Kraft
*Assistant Examiner* — Joshua Campbell
(74) *Attorney, Agent, or Firm* — Morgan, Lewis & Bockius LLP (57) ABSTRACT

A method of controlling an electro-mechanical brake device, includes: switching a central electronic control unit (ECU) to an awake mode based on a wake-up signal; transmitting a signal such that a wheel ECU is switched from a sleep mode to the awake mode; when a braking input is detected, supplying a current to a motor mounted on an electro-mechanical brake (EMB) using current control to generate a braking force; when a parking braking force is less than a required braking force, controlling the wheel ECU to release the parking braking force and generate the required braking force, and when the parking braking force is greater than or equal to the required braking force, releasing the parking braking force and maintaining the braking force generated in a wheel; when the braking force reaches the required braking force or the braking force is maintained, switching the current control to position control.

9 Claims, 3 Drawing Sheets

(58) Field of Classification Search
USPC .......................................................... 701/70
See application file for complete search history.

(56) References Cited

U.S. PATENT DOCUMENTS

| | | | | |
|---|---|---|---|---|
| 6,202,018 | B1* | 3/2001 | Stumpe | B60T 13/662 |
| | | | | 303/20 |
| 6,256,570 | B1 | 7/2001 | Weiberle et al. | |
| 2009/0200124 | A1* | 8/2009 | Heise | B60T 7/107 |
| | | | | 188/162 |
| 2012/0118681 | A1* | 5/2012 | Cho | B60T 8/3255 |
| | | | | 188/72.1 |
| 2013/0124021 | A1* | 5/2013 | Chung | B60W 30/18063 |
| | | | | 903/930 |
| 2014/0163834 | A1* | 6/2014 | Kim | B60T 13/741 |
| | | | | 701/70 |
| 2015/0136538 | A1* | 5/2015 | Kim | B60T 13/588 |
| | | | | 188/72.6 |

OTHER PUBLICATIONS

Office Action issued on Jan. 18, 2025 in Korean Patent Application No. 10-2020-0132249 with English translation Note: US2009-0200124A and U.S. Pat. No. 6,144,312B cited therein are already of record.

* cited by examiner

ELECTRO-MECHANICAL BRAKE DEVICE AND METHOD OF CONTROLLING THE SAME

CROSS-REFERENCE TO RELATED APPLICATION

This application claims priority to and the benefit of Korean Patent Application No. 10-2020-0132249, filed on Oct. 13, 2020, the disclosure of which is incorporated herein by reference in its entirety.

BACKGROUND

1. Technical Field

Embodiments of the present disclosure relate to an electro-mechanical brake device and a method of controlling the same.

2. Discussion of Related Art

The content described in this section merely provides background information about the present disclosure and does not constitute the related art.

Electro-mechanical brakes (EMBs) have been developed and widely used. Although the EMB has been developed to be used as an electronic parking brake (EPB), recently, as the EMB has been used for main braking by replacing the conventional hydraulic brake, a use area thereof has been expanded. The EMB is a device in which an actuator driven by a motor is mounted on a brake caliper to directly brake a vehicle with a motor driving force without a medium such as brake fluid. The EMB has a mechanism similar to that of the EPB, but unlike the EPB, the EMB is mainly used for main braking and thus requires higher braking response and operational durability than the EPB. In addition, as compared with a hydraulic brake, the EMB has a simpler structure and a faster braking response speed and is able to be more precisely controlled, thereby having excellent braking safety.

Meanwhile, a central control unit (CCU) and a wheel control unit (WCU) which control the EMB to wait in a sleep mode when a driver does not board the vehicle. When the driver boards the vehicle, a wake-up sensor activates the CCU and the WCU in the sleep mode using a door open signal, a brake light signal, an ignition signal, or the like.

However, when the wake-up sensor is connected to the WCU, there are problems of increasing the number of connector pins included in the WCU and complicating a connection structure.

In order to overcome the problems of increasing the number of the connector pins and complicating the connection structure, when the door open signal, the brake light signal, the ignition signal, or the like is applied to the CCU, and the CCU activates the WCU using in-vehicle communication, the number of the connector pins can be reduced, and the connection structure can be simplified. However, there is a problem in that the time required for initializing the ECU and the actuator of the EMB is increased, and furthermore, there is a problem in that a delay occurs when the EMB generates a braking force.

SUMMARY

The present disclosure is directed to reducing the number of connector pins and simplifying a connection structure by applying a door open signal, a brake light signal, an ignition signal, or the like to a central electronic control unit according to one embodiment of the present disclosure and allowing the central electronic control unit to activate a wheel electronic control unit using in-vehicle communication.

The present disclosure is also directed to allowing the central electronic control unit to activate the wheel electronic control unit using the in-vehicle communication and simplifying the initialization of an actuator of an electro-mechanical brake (EMB) actuator and minimizing the time required for initializing the EMB such that a delay does not occur when the EMB generates a braking force.

According to at least one aspect, the present disclosure provides a method of controlling an electro-mechanical brake device, the method comprising: a central electronic control unit awaking operation of switching a central electronic control unit to an awake mode based on a wake-up signal received from a wake-up sensor; a wheel electronic control unit awaking operation of transmitting a signal using in-vehicle communication such that a wheel electronic control unit is switched from a sleep mode to the awake mode; a current control operation of, when a braking input is detected, supplying a current to a motor mounted on an electro-mechanical brake using a current control to generate a braking force; a comparing operation of comparing a parking braking force to a magnitude of a required braking force based on the braking input; a braking force generating operation of, when the parking braking force is determined to be less than the required braking force, controlling the wheel electronic control unit to release the parking braking force and generate the required braking force, and when determined to be the parking braking force is determined to be greater than or equal to the required braking force, releasing the parking braking force and maintaining the braking force generated in a wheel; a position control operation of, when the braking force reaches the required braking force or the braking force is maintained, switching the current control to a position control; and an initializing operation of, when a braking force release signal is transmitted, identifying a contact point between a brake pad and a disc when a piston mounted on the electro-mechanical brake is retracted, and initializing the electro-mechanical brake.

| REFERENCE NUMERICALS | |
|---|---|
| 100: sensor unit | 112: position sensor |
| 114: current sensor | 116: stroke sensor |
| 118: wake-up sensor | 120: central electronic control unit |
| 122: first microcomputer | 124: second microcomputer |
| 131: FL controller | 132: FR controller |
| 133: RL controller | 134: RR controller |
| 140: brake unit | 150: plurality of wheel brake units |
| 160: plurality of batteries | 162: first battery |
| 164: second battery | |

DETAILED DESCRIPTION OF EXEMPLARY EMBODIMENTS

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Figure 1:
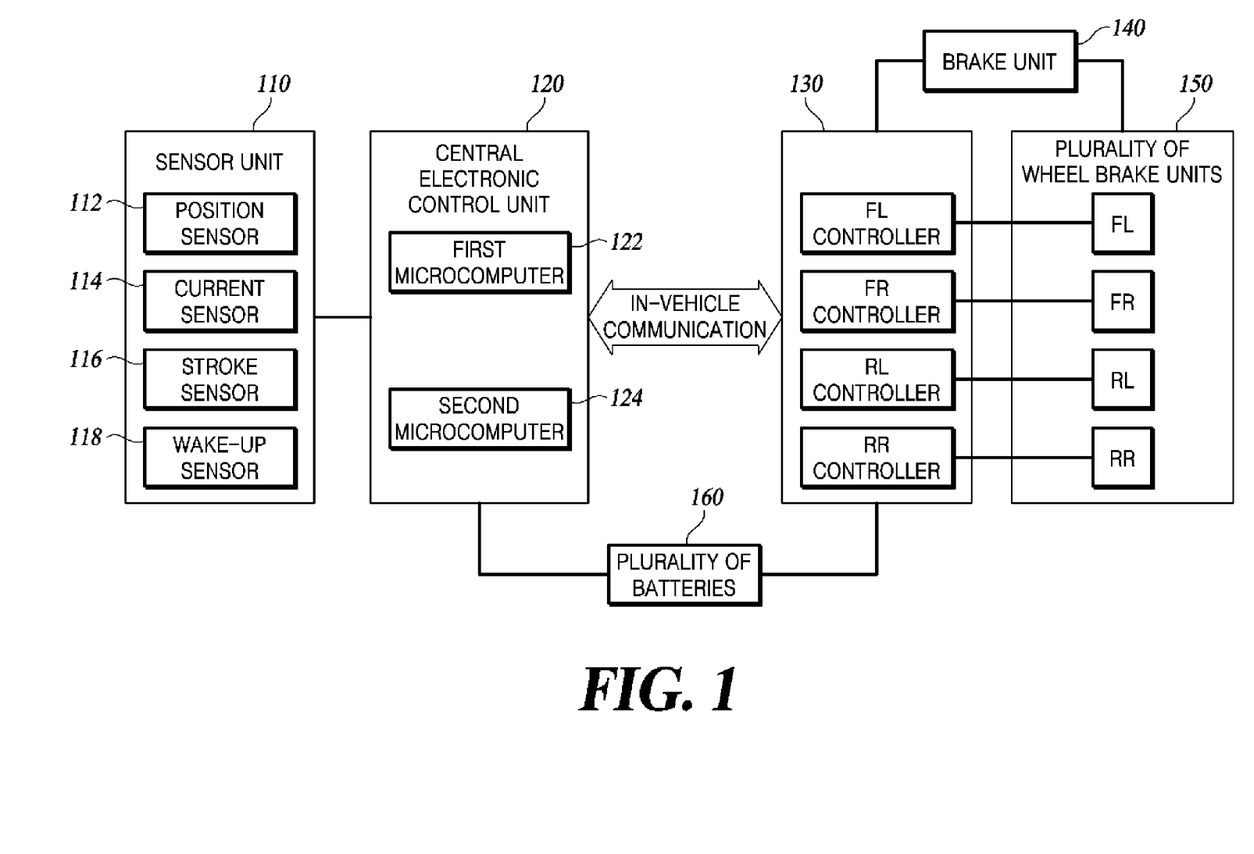
FIG. 1 is a block diagram of an electro-mechanical brake device according to one embodiment of the present disclosure.

FIG. 1 is a block diagram of an electro-mechanical brake device according to one embodiment of the present disclosure.

Figure 2:
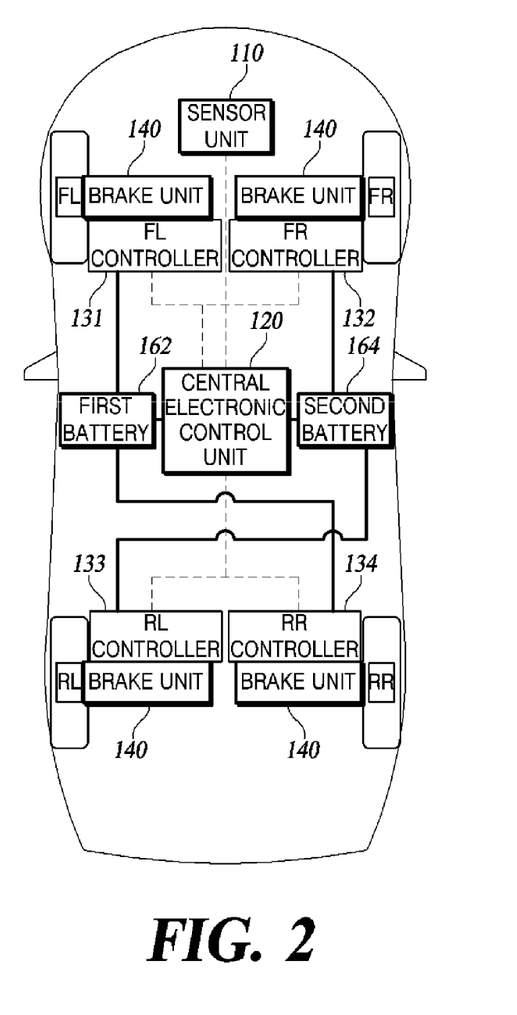
FIG. 2 is a block diagram of an electro-mechanical brake device for a vehicle according to one embodiment of the present disclosure.

FIG. 2 is a block diagram of an electro-mechanical brake device for a vehicle according to one embodiment of the present disclosure.

Referring to FIGS. 1 and 2, an electro-mechanical brake device 100 according to one embodiment of the present disclosure includes all or some of a sensor unit 110, a central electronic control unit (central ECU) 120, a wheel ECU 130, a brake unit 140, a plurality of wheel brake units 150, and a plurality of batteries 160.

The sensor unit 110 includes all or some of a position sensor 112, a current sensor 114, a stroke sensor 116, and a wake-up sensor 118.

The position sensor 112 measures an operating distance of a motor. Here, the operating distance refers to a linear movement distance when a piston (not shown) of an electro-mechanical brake (EMB) linearly moves as the motor rotates.

Meanwhile, in order for the EMB to generate a braking force, the piston presses a brake pad (not shown). A force with which the piston presses the brake pad is defined as a clamping force.

The current sensor 114 measures a current flowing in the motor.

The stroke sensor 116 detects a stroke intensity of a brake pedal (not shown). A braking force release signal may be generated based on stroke information transmitted by the stroke sensor 116.

The wake-up sensor 118 is a sensor which detects a driver's movement before a vehicle starts to operate in order to activate the central ECU 120. The wake-up sensor 118 may be, for example, a door open sensor (not shown) which detects whether a door of a driver seat is opened and generates and transmits a door open signal to the central ECU 120.

Since the door open sensor is generally installed in the door at the driver's seat, when a driver boards the vehicle through a passenger seat, the door open sensor cannot detect whether the driver boards the vehicle. Accordingly, the wake-up sensor may further include a brake light sensor (BLS) (not shown) which detects whether a brake light is turned on and an ignition sensor (not shown) which detects whether an engine is turned on.

The sensor unit 110 transmits various pieces of detected information to the central ECU 120.

The central ECU 120 includes a first microcomputer 122 and a second microcomputer 124. The central ECU 120 generates a friction braking signal and a friction braking release signal which are for controlling the wheel ECU 130.

The central ECU 120 receives power from the plurality of batteries 160. More specifically, the first microcomputer 122 receives power from a first battery 162, and the second microcomputer 124 receives power from a second battery 164.

The central ECU 120 controls the EMB mounted on each of front and rear wheels to generate a braking force. More specifically, the first microcomputer 122 transmits an electrical signal such that an FL controller 131 causes the EMB mounted on a front left wheel to generate a braking force, and the first microcomputer 122 transmits an electrical signal such that an RR controller 134 causes the EMB mounted on a rear right wheel to generate a braking force. The FL controller 131 and the RR controller 134, which receive the signals, control the EMBs to supply braking forces to the front left wheel and the rear right wheel. Here, the electrical signal is a signal transmitted using in-vehicle communication, for example, controller area network (CAN) communication. In addition, the in-vehicle communication may be local area network (LAN) communication.

The first microcomputer 122 determines whether braking is required for the vehicle. Whether braking is required for the vehicle is determined based on various factors, for example, a stroke intensity of a brake pedal. When it is determined that a braking input is required, the first microcomputer 122 calculates a braking force required to brake the vehicle. The first microcomputer 122 controls the brake unit 140 such that the plurality of wheel brake units 150 generate calculated braking forces.

Since the second microcomputer 124 performs a function similar to that of the first microcomputer 122, differences from the first microcomputer 122 will be mainly described for convenience of description.

The second microcomputer 124 receives power from the second battery 164.

Processes, in which the second microcomputer 124 determines whether braking is required for the vehicle, calculates a braking force, and controls the brake unit 140, follow the same algorithm as the first microcomputer 122. However, there is a difference in that the first microcomputer 122 brakes the front left wheel and the rear right wheel, and the second microcomputer 124 brakes a front right wheel and a rear left wheel.

The second microcomputer 124 transmits an electrical signal such that an FR controller 132 causes the EMB mounted on the front right wheel to generate a braking force, and the second microcomputer 124 transmits an electrical signal such that an RL controller 133 causes the EMB mounted on the rear left wheel to generate a braking force. The FR controller 132 and the RL controller 133, which receive the signals, control the EMBs to supply braking forces to the front right wheel and the rear left wheel.

The central ECU 120 receives a wake-up signal from the wake-up sensor 118. Here, the wake-up signal refers to a door open signal, a brake light signal, an ignition signal, or the like.

The central ECU 120 receiving at least one of the door open signal, the light signal, and the ignition signal from the wake-up sensor 118 activates the wheel ECU 130 using in-vehicle communication. For example, when the central ECU 120 receives the light signal, the central ECU 120 activates the wheel ECU 130 using CAN communication.

According to one embodiment of the present disclosure, the wake-up sensor 118 is not connected directly to the wheel ECU 130 and is connected to the central ECU 120. When the wake-up sensor 118 detects a driver's movement, for example, a driver's movement for boarding the vehicle, the wake-up sensor 118 transmits the wake-up signal to the central ECU 120. The central ECU 120 receiving the wake-up signal is switched from a sleep mode to an awake mode. Thereafter, the central ECU 120 activates the wheel ECU 130 using in-vehicle communication, for example, CAN communication.

When a circuit is designed in such a way that the central ECU 120 activates the wheel ECU unit 130 using the in-vehicle communication, the wheel ECU 130 does not need to separately include a connector pin for receiving the wake-up signal from the wake-up sensor 118. Accordingly, in the wheel ECU 130 according to one embodiment of the present disclosure, the number of connector pins is reduced as compared with a conventional wheel ECU. When the number of the connector pins is reduced, there are advantages in that, when the EMB is designed, a layout is simplified and the size of the EMB is decreased.

The wheel ECU 130 includes the FL controller 131, the FR controller 132, the RL controller 133, and the RR controller 134.

The wheel ECU 130 is mounted on a gear box or a motor. More specifically, the FL controller 131 is mounted on a motor or gear box provided on a first wheel brake FL of the front left wheel, the FR controller 132 is mounted on a motor or gear box provided on a second wheel brake FR of the front right wheel, the RL controller 133 is mounted on a motor or gear box provided on a third wheel brake RL of the rear left wheel, and the RR controller 134 is mounted on a motor or a gear box provided on a fourth wheel brake RR of the rear right wheel.

The wheel ECU 130 receives power from the plurality of batteries 160. Specifically, the FL controller 131 receives power from the first battery 162, the FR controller 132 receives power from the second battery 164, the RL controller 133 receives power from the second battery 164, and the RR controller 134 receives power from the first battery 162.

A reason for the wheel ECU 130 to receive power from each of the plurality of batteries 160 is to secure redundancy when a failure occurs in any one of the plurality of batteries 160, for example, the first battery 162. In other words, even when a failure occurs in the first battery 162 and the FL controller 131 does not operate, the FR controller 132 receives power from the second battery 164 and generates a braking force in the front right wheel to brake the vehicle. Here, the redundancy means that, even when a failure occurs in the first battery 162 and the FL controller 131 does not operate, the FR controller 132 connected to the second battery 164 operates to brake the vehicle, thereby securing the braking stability of the vehicle.

When a signal is received from the central ECU 120 using communication, for example, CAN communication, the wheel ECU 130 according to one embodiment of the present disclosure is switched from a sleep mode to an awake mode.

According to one embodiment of the present disclosure, the EMB is not initialized at a time point at which a sleep mode is switched to an awake mode, rather, the EMB is initialized at a time point at which the driver takes his/or her foot off the brake pedal, that is, at a time point at which the piston is retracted to release a braking force. Therefore, the wheel ECU 130 switched to the awake mode does not perform control for initializing the EMB before the driver takes his/her foot off the brake pedal.

It is common for the driver to turn on an ignition switch while depressing the brake pedal and then start the vehicle while slowly taking his/her foot off the brake pedal. When the EMB is initialized at a time point at which the driver depresses the brake pedal, before the EMB generates a braking force, the time for generating a braking force is delayed by as much as the time required for initializing the EMB. On the other hand, when the EMB is not initialized at a time point at which the brake pedal is depressed and the EMB is initialized at a time point at which, after ignition is turned on, a braking force is released to start the vehicle, a delay time for the EMB does not occur at a time point at which the brake is depressed.

That is, when the EMB is not initialized in a process of switching the wheel ECU to the awake mode and the EMB is initialized in a process of releasing a braking force, there is an effect of preventing a delay due to the initialization of the EMB when the wheel ECU is switched to the awake mode.

The brake unit 140 includes a motor (not shown), a gear box (not shown), a piston (not shown), a brake pad (not shown), a caliper housing (not shown), and a caliper body (not shown).

In addition, the brake unit 140 includes a front wheel brake unit (not shown) which generates a braking force in the front wheel and a rear wheel brake unit (not shown) which generates a braking force in the rear wheel.

When a current flow in the motor, the motor rotates forward or backward to generate a rotational force. The rotational force of the motor is transmitted to a screw (not shown) of the gear box so as to generate a braking force.

The gear box includes a plurality of gears and screws which allow a spindle (not shown) to linearly move by the rotational force of the motor. When the spindle of the gearbox linearly moves, the piston attached to one end portion of the caliper body moves forward or backward, and thus, the brake pad connected to the piston presses a disc (not shown) to generate a braking force.

A typical configuration related to the driving of the gear box in the present disclosure is a technology that is obvious to those of ordinary skill in the art, and thus, the illustration and description thereof will be omitted.

Although the electro-mechanical brake device 100 described in the present disclosure has been developed as an electronic parking brake (EPB), recently, as the electro-mechanical brake device 100 has been used for main braking by replacing a conventional hydraulic brake, a use area thereof has been expanded. Although it is common that a parking function is integrated into the EMB, in one embodiment of the present disclosure, the electro-mechanical brake device 100 includes both a main brake having no parking function and a brake having a parking function.

The plurality of wheel brake units 150 include the first wheel brake FL installed on the front left wheel, the second wheel brake FR installed on the front right wheel, the third wheel brake RL installed on the rear left wheel, and the fourth wheel brake RR installed on the rear right wheel.

In the detailed description of the present disclosure, front wheel brakes refer to the first wheel brake FL and the second wheel brake FR, and rear wheel brakes refer to the third wheel brake RL and the fourth wheel brake RR. A plurality of wheels include all of the front left wheel, the front right wheel, the left rear wheel, and the right rear wheel. The plurality of wheels are rotatably installed on the vehicle body and receive braking forces from the plurality of wheel brake units 150.

The plurality of batteries 160 include the first battery 162 and the second battery 164.

The first battery 162 supplies power to the central ECU 120, the FL controller 131, and the RR controller 134, and the second battery 164 supplies power to the central ECU 120, the FR controller 132, and the RL controller 133. The first battery 162 and the second battery 164 may be 12 V low voltage batteries used in a braking system.

When a failure occurs in any one of the plurality of batteries 160 and power is not supplied to the first microcomputer 122 or the second microcomputer 124 of the central ECU 120, the microcomputer normally receiving power controls the wheel ECU 130.

Figure 3:
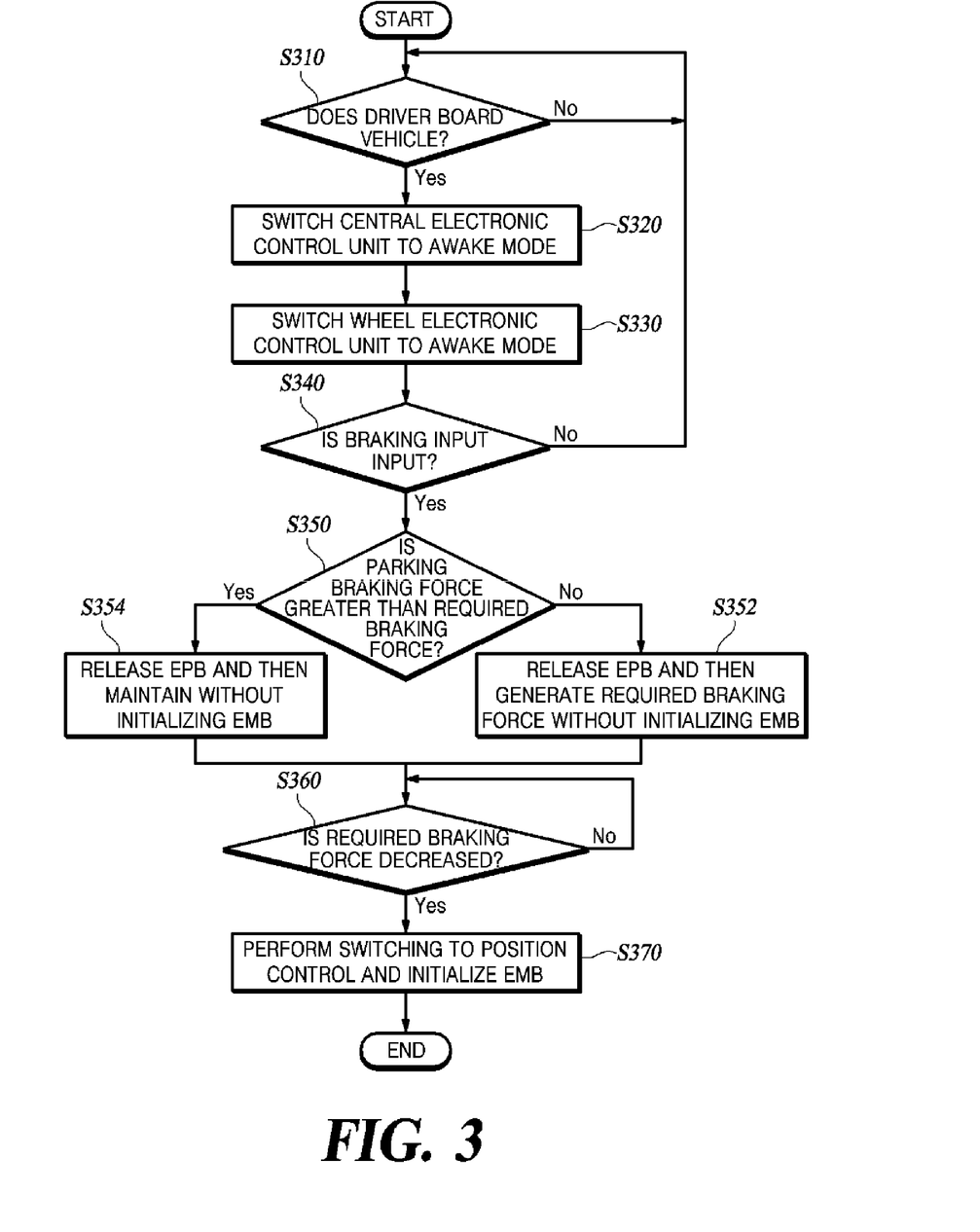
FIG. 3 is a flowchart illustrating an algorithm of a central electronic control unit according to one embodiment of the present disclosure.

FIG. 3 is a flowchart illustrating an algorithm of a central ECU according to one embodiment of the present disclosure.

Referring to FIG. 3, in order to switch a central ECU in a sleep mode from the sleep mode to an awake mode, whether a driver boards a vehicle is determined (S310). For example, before ignition is turned on, a wake-up sensor 118 detects whether the driver boards the vehicle. When the wake-up sensor 118 detects that the driver boards the vehicle, the wake-up sensor 118 transmits a door open signal to the central ECU 120. In addition, according to another embodiment of the present disclosure, the wake-up sensor 118 includes at least one of a door open sensor, an ignition sensor, and a BLS, and when at least one of a door open signal, an ignition signal, and a brake light signal is received, the central ECU 120 determines that the driver boards the vehicle.

When the driver does not board the vehicle, the central ECU 120 continues to maintain the sleep mode until a wake-up signal is received from the wake-up sensor 118.

Meanwhile, when it is determined that the driver boards the vehicle, for example, when at least one of the door open signal, the brake light signal, and the ignition signal is received, the central ECU 120 is switched from the sleep mode to the awake mode (S320).

Next, the central ECU 120 activates a wheel ECU 130 using in-vehicle communication (S330). Here, the in-vehicle communication is, for example, CAN communication used to transmit a signal.

After the wheel ECU 130 is switched to an awake mode, the central ECU 120 determines whether a braking input is input to the vehicle (S340). When the driver boards the vehicle, the driver first depresses a brake pedal to turn the ignition on. Accordingly, even before the driver turns the ignition on, the central ECU 120 in the awake mode may determine whether a braking input is required according to whether the brake pedal is depressed. In the case of the driver boarding on the passenger seat side instead of the driver seat side, even when the door open sensor can not detect the boarding of the driver, and thus, the central ECU 120 is in the sleep mode, when the brake pedal is depressed before ignition is turned on, a BLS may transmit the brake light signal to the central ECU 120 so that the central ECU 120 may be switched to the awake mode. When the central ECU 120 is switched to the awake mode, the central ECU 120 detects a braking input of the driver.

When the central ECU 120 detects the braking input, the central ECU 120 may supply a current to a motor mounted in an electro-mechanical brake device 100 using current control to generate a braking force.

When it is determined that the braking input is input to the vehicle, the central ECU 120 compares a required braking force required by the driver depressing the brake pedal with a magnitude of a parking braking force generated in a wheel (S350).

When it is determined that the parking braking force is not greater than the required braking force, since a greater braking force, that is, the required braking force, should be generated, the central ECU 120 transmits a signal to the wheel ECU 130 such that an EPB is released and an EMB generates the required braking force (S352). When the vehicle is parked on a slope, for example, when a parking braking force is 10 kN and a required braking force required by the driver depressing the brake pedal is 12 kN, the central ECU 120 releases a parking braking force and further generates a braking force of 2 kN. Since the EMB of one embodiment of the present disclosure may not be a brake device provided separately from the EPB and functions of the EMB may include a function of the EBP, even though the EPB releases a parking braking force, a braking force does not become 0 kN, but a braking force of 10 kN is continuously maintained. Therefore, the EMB only needs to further generate a braking force of 2 kN.

On the other hand, when it is determined that the required braking force is not greater than the parking braking force, since a greater braking force, that is, a braking force greater than or equal to the parking braking force, should be generated in the vehicle, the central ECU 120 transmits a signal to the wheel ECU 130 such that the EPB is released, and the EMB maintains the generated braking force (S354).

According to one embodiment of the present disclosure, in operation S352 or S354, the wheel ECU 130 performs current control to generate or maintain a required braking force in the vehicle. Here, the wheel ECU 130 performs current control without initializing the EMB.

When the wheel ECU 130 performs current control to generate a braking force without initializing the EMB, due to an error in a current signal, the central ECU 120 cannot accurately estimate a braking force generated in the vehicle. Therefore, the braking force generated in the vehicle does not match a braking force required by the driver. However, a braking force required before the driver turns the ignition on does not require an accurate braking force unlike a state in which the vehicle is traveling. That is, since an accurate braking force does not need to be generated in the vehicle, even though there is a difference between the braking force required by the driver and the braking force generated in the vehicle, it is sufficient just to maintain the vehicle in a stopped state.

Thereafter, the central ECU 120 determines whether the required braking force is decreased (S360).

When the driver turns the ignition on, the driver should slowly take his/her foot off the brake pedal to start the vehicle. When the driver starts to take his/her foot off the brake pedal, a stroke intensity of the driver detected by a stroke sensor 116 is decreased. The central ECU 120 determines whether to generate a friction braking release signal for releasing the braking force from the vehicle by calculating the required braking force based on the decreased stroke intensity.

When it is determined that the braking force required by the driver is not decreased, the central ECU continues to perform current control and waits until a signal indicating that the driver takes his/her foot off the brake pedal is transmitted.

Meanwhile, when it is determined that the braking force required by the driver is decreased, the central ECU 120 determines to release the braking force, switches the current control to position control and initializes the EMB (S370).

When the driver starts to take his/her foot off the brake pedal, since the required braking force is decreased, a piston mounted on the EMB starts to be retracted.

Unlike the case of a parked state, when the vehicle is in a traveling state, the central ECU 120 should generate a braking force that matches a braking force required by the driver. Therefore, the central ECU 120 should accurately measure a position of a contact point between the brake pad and a disc by performing an EMB initialization process before the vehicle starts. The central ECU 120 adjusts a gap between the brake pad and the disc based on the measured position of the contact point. Accordingly, in one embodiment of the present disclosure, the EMB initialization not performed in operation S352 or S354 is performed when a braking force is released to start the vehicle.

Since operations S330, S340, and S350 are performed almost simultaneously, when the EMB initialization is performed in operation S352 or S354, that is, when the wheel ECU 130 is switched to the awake mode and the EMB initialization is also performed, the time for waking the wheel ECU 130 up is delayed, and a delay occurs when a braking force is generated or maintained in operation S352 or S354. Therefore, in one embodiment of the present disclosure, by performing the EMB initialization in operation S370, there is an effect of simplifying and minimizing the EMB initialization such that a delay time does not occur when the EMB generates a braking force after the central ECU 120 activates the wheel ECU 130 using in-vehicle communication.

That is, in operation S352 or S354, since the vehicle is in a parked state and the EMB initialization is not performed, even though the EMB does not generate an accurate braking force required by the driver, there is no big problem in maintaining the vehicle in a stopped state, and thus, the EMB initialization is performed in operation S370.

In addition, a process of switching current control to position control has an effect of preventing overheating of a motor. When the holding time of a clamping force is increased by continuously performing current control, a current consumed in the motor is continuously increased such that overheating occurs. Thus, the current control is switched to the position control.

When there is a change in braking force required for the vehicle after the current control is switched to the position control, for example, when the driver slowly takes his/her foot off the brake pedal, the central ECU 120 controls the required braking force based on a change in stroke intensity detected by the stroke sensor 116. For example, when the current control is switched to the position control, when a displacement, by which a piston of the EMB needs to be retracted based on the detected change in stroke intensity, is calculated as 0.1 mm, an FL piston and an FR piston have different displacements of 0.8 mm and 0.9 mm. However, irrespective of the different displacements of the pistons, it is sufficient to move a displacement only by as much as a required change amount corresponding to +0.1 mm. For example, in this case, the displacement of the FL piston is changed from 0.8 mm to 0.9 mm, and the displacement of the FR piston is changed from 0.9 mm to 0.8 mm.

Meanwhile, when the current control is switched to the position control, the EMB maintains a clamping force generated during the current control. When a component configured to maintain a clamping force in the EMB, for example, a ball screw, is tightened, that is, a clamping force is further generated, the clamping force is represented by Equation 1, and when the screw is loosened, that is, when the clamping force is released, the clamping force is represented by Equation 2.

$$P = Q \times \tan(\sigma + \lambda) \quad \text{[Equation 1]}$$

$$P' = Q \times \tan(\rho - \lambda) \quad \text{[Equation 2]}$$

Here, P denotes torque when the screw is tightened, P' denotes a rotational force when the screw is loosened, Q denotes an axial force, ρ denotes a friction angle, and λ denotes a screw angle.

Meanwhile, rotational torque when the screw is tightened is represented by Equation 3, and rotational torque when the screw is loosened is represented by Equation 4.

$$T = P \times \frac{d_e}{2} \quad \text{[Equation 3]}$$

$$T' = P' \times \frac{d_e}{2} \quad \text{[Equation 4]}$$

Here, T denotes rotational torque when the screw is tightened, T' denotes rotational torque when the screw is loosened, P denotes a rotational force calculated in Equation 1, P' denotes a rotational force calculated in Equation 2, and $d_e$ denotes an effective diameter of the screw.

Differences between the rotational force and rotational torque when the screw is tightened and the rotational force and rotational torque when the screw is loosened are caused due to a difference between addition and subtraction of a screw angle. That is, when the screw tightened, a rotational force and rotational torque are relatively great, and when the screw is loosened, a rotational force and rotational torque are relatively small.

Therefore, in order to generate a clamping force, since the screw should be tightened, relatively great rotational torque is required, and in order to maintain a clamping force, since it is only necessary to maintain rotational torque sufficient to prevent the screw from loosening, additional power is not required to generate rotational torque in a situation in which the clamping force is maintained.

Therefore, when the current control is continuously maintained in operation S370, a current is continuously consumed, but when the current control is switched to the position control, since it is necessary to maintain only the clamping force that has already been generated, there is an effect of reducing the required rotational torque and also reducing current consumption.

As described above, according to the present embodiment, in a central ECU, when a door open signal, a brake light signal, an ignition signal, or the like is applied to the central ECU, and the central ECU activates a wheel ECU using in-vehicle communication, there is an effect of reducing the number of connector pins and simplifying a connection structure.

In addition, according to the present embodiment, the central ECU activates the wheel ECU using the in-vehicle communication so that there is an effect of simplifying the initialization of the wheel ECU and an actuator of an EMB and minimizing the time required for the initialization such that a delay does not occur when the EMB generates a braking force.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Various embodiments of systems and techniques described herein can be realized by a programmable computer. Here, the computer includes a programmable processor, a data storage system (including a volatile memory, a non-volatile memory, another type of storage system, or combinations thereof), and at least one communication interface. For example, the programmable computer may be one of a server, a network device, a set-top box, an embedded device, a computer expansion module, a personal computer, a laptop, a personal data assistant (PDA), a cloud computing system, and a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A method of controlling an electro-mechanical brake device, the method comprising:
a central electronic control unit awaking operation of switching a central electronic control unit to an awake mode based on a wake-up signal received from a wake-up sensor;
a wheel electronic control unit awaking operation of transmitting a signal using in-vehicle communication such that a wheel electronic control unit is switched from a sleep mode to the awake mode;
a current control operation of, in response to detecting a braking input of a driver, supplying a current to a motor mounted on an electro-mechanical brake using current control to generate a braking force;
a comparing operation of comparing a parking braking force to a magnitude of a required braking force based on the braking input;
a braking force generating operation of, in response to determining that the parking braking force is determined to be less than the required braking force, controlling the wheel electronic control unit to release the parking braking force and generate the required braking force, and in response to determining the parking braking force is greater than or equal to the required braking force, releasing the parking braking force and maintaining the braking force generated in a wheel;
a position control operation of, in response to determining that the braking force reaches the required braking force or the braking force is maintained, switching the current control to a position control; and
an initializing operation of not performing initializing the electro-mechanical brake at a time point at which the sleep mode is switched to the awake mode, but initializing the electro-mechanical brake at a time point at which, after ignition is turned on, a braking force release signal indicating that the driver starts to take a foot off a brake pedal is transmitted to start the vehicle in a stopped state and a decrease in stroke intensity of the driver's foot on the brake pedal is detected by a stroke sensor such that the required braking force generated by the braking input of the driver is decreased, wherein the initializing the electro-mechanical brake includes identifying a contact point between a brake pad and a disc in response to determining that a piston mounted on the electro-mechanical brake is retracted and adjusting a gap between the disc and the brake pad based on the contact point.

2. The method of claim 1, wherein the in-vehicle communication is any one of controller area network (CAN) communication or local area network (LAN) communication.

3. The method of claim 1, wherein the wake-up signal is a door open signal generated by a door open sensor.

4. The method of claim 1, wherein the wake-up signal is a brake light signal generated by a brake light sensor (BLS).

5. The method of claim 1, wherein the wake-up signal is an ignition signal generated by an ignition sensor.

6. The method of claim 1, wherein, after the braking input of the driver is detected, the electro-mechanical brake is not initialized until the braking force release signal indicating that the driver takes the foot off the brake pedal is transmitted.

7. An electro-mechanical brake device for a vehicle, comprising:
an electro-mechanical brake (EMB) which includes motors and a plurality of wheel brake units configured to brake a front wheel and a rear wheel;
a sensor unit which includes a wake-up sensor configured to detect whether a driver boards the vehicle and detects a braking input of the driver;
a central electronic control unit (ECU) configured to be switched from a sleep mode to an awake mode based on a wake-up signal generated by the wake-up sensor and to calculate a required braking force based on the braking input;
a wheel ECU configured to be switched from the sleep mode to the awake mode in response to transmitting a signal using in-vehicle communication by the central ECU and to control the EMB to generate the required braking force; and
one or more batteries which supply power to the wheel ECU and the central ECU, wherein the EMB is not initialized at a time point at which the sleep mode is switched to the awake mode, but the EMB is initialized at a time point at which, after ignition is turned on, a braking force release signal indicating that the driver starts to take a foot off a brake pedal is transmitted to start the vehicle in a stopped state and a decrease in stroke intensity of the driver's foot on the brake pedal is detected by a stroke sensor such that the required braking force generated by the braking input of the driver is decreased, wherein, when initializing the EMB, the central ECU identifies a contact point between a brake pad and a disc in response to determining that a piston mounted on the EMB is retracted, and adjusts a gap between the disc and the brake pad based on the contact point.

8. The electro-mechanical brake device of claim 7, wherein the wake-up sensor includes at least one of a door open sensor, a brake light sensor (BLS), or an ignition sensor, and in response to receiving by the central ECU at least one of a door open signal, a brake light signal, or an ignition signal generated by the wake-up sensor, the central ECU is switched to the awake mode.

9. The electro-mechanical brake device of claim 7, wherein, after the braking input of the driver is detected, the EMB is not initialized until the braking force release signal is transmitted.

* * * * *